United States Patent
Zeng et al.

(10) Patent No.: US 10,153,474 B1
(45) Date of Patent: Dec. 11, 2018

(54) SEPARATORS HAVING IMPROVED TEMPERATURE RANGES FOR BATTERY SHUTDOWN

(71) Applicant: Apple Inc., Cupertino, CA (US)

(72) Inventors: Qingcheng Zeng, Cupertino, CA (US); Donald G. Dafoe, San Jose, CA (US)

(*) Notice: Subject to any disclaimer, the term of this patent is extended or adjusted under 35 U.S.C. 154(b) by 0 days.

(21) Appl. No.: 15/266,309

(22) Filed: Sep. 15, 2016

Related U.S. Application Data

(60) Provisional application No. 62/235,109, filed on Sep. 30, 2015.

(51) Int. Cl.
*H01M 2/00* (2006.01)
*H01M 2/16* (2006.01)

(52) U.S. Cl.
CPC ....... *H01M 2/1686* (2013.01); *H01M 2/1646* (2013.01); *H01M 2/1653* (2013.01)

(58) Field of Classification Search
CPC ...... H01M 2/14; H01M 2/162; H01M 2/1653; H01M 2/14686; H01M 2/185; H01M 2/16; H01M 2/164
See application file for complete search history.

(56) References Cited

U.S. PATENT DOCUMENTS

| | | |
|---|---|---|
| 2005/0214637 A1 | 9/2005 | Imachi et al. |
| 2006/0019154 A1 | 1/2006 | Imachi et al. |
| 2007/0264577 A1 | 11/2007 | Katayama et al. |
| 2010/0209745 A1* | 8/2010 | Kimishima ............... C08J 9/28 429/50 |
| 2014/0170465 A1* | 6/2014 | Visco .................... H01G 11/06 429/144 |
| 2017/0222270 A1* | 8/2017 | Uehara ............ H01M 10/0569 |

* cited by examiner

*Primary Examiner* — Cynthia H Kelly
*Assistant Examiner* — Monique M Wills
(74) *Attorney, Agent, or Firm* — Polsinelli PC

(57) ABSTRACT

Battery separators are presented having improved temperature ranges for battery shutdown. The battery separators include a first layer having a first shutdown temperature range, a second layer having a second shutdown temperature range, and a third layer having a third shutdown temperature range. The first shutdown temperature range and the second shutdown temperature range have a first overlap in temperature. The second shutdown temperature range and third shutdown temperature range have a second overlap in temperature. In some embodiments, the second layer is disposed between the first layer and the third layer to create a sandwiched structure.

13 Claims, 3 Drawing Sheets

SEPARATORS HAVING IMPROVED TEMPERATURE RANGES FOR BATTERY SHUTDOWN

CROSS-REFERENCE TO RELATED APPLICATIONS

This application claims the benefit under 35 U.S.C. § 119(e) of U.S. Provisional Application Ser. No. 62/235,109, filed Sep. 30, 2015, and entitled "SEPARATORS HAVING IMPROVED RANGES FOR BATTERY SHUTDOWN", which is incorporated herein by reference in its entirety.

FIELD

This disclosure relates generally to batteries, and more particularly, to separators having improved temperature ranges for battery shutdown.

BACKGROUND

Separators represent structures in a battery, such as interposed layers, that prevent physical contact of cathodes and anodes while allowing ions to transport therebetween. Separators are formed of materials having pores that provide channels for ion transport, which may include absorbing an electrolyte that contains the ions. Materials for separators are often selected according to softening temperatures, above which, pores rapidly collapse and choke off ion transport. Such softening temperatures may allow separators to arrest operation of the battery when heat generated therein exceeds a safety threshold (e.g., a critical operating temperature).

A shutdown temperature range is typically associated with separators. The shutdown temperature range can be bound by a lower temperature limit and an upper temperature limit. Within the lower temperature limit and the upper temperature limit, the separator offers a high resistance to ion transport. The lower temperature limit corresponds to an onset of pore collapse, which rapidly chokes off ion transport through the separator. Chemical reactions in the battery therefore are arrested and the battery "shuts down". The upper temperature limit corresponds to a breakdown of the separator, which may include melting and chemical decomposition. At the upper temperature limit, ion-transport begins to increase, which may stem from direct contact between a cathode and an anode.

The battery industry seeks to improve the temperature shutdown range associated with separators. Such improvement may involve decreasing the lower temperature limit, increasing the upper temperature limit, or both.

SUMMARY

The embodiments described herein relate to battery separators having improved temperature ranges for battery shutdown. In some embodiments, the battery separators include a first layer having a first shutdown temperature range, a second layer having a second shutdown temperature range, and a third layer having a third shutdown temperature range. The first shutdown temperature range and the second shutdown temperature range have a first overlap in temperature. Likewise, the second shutdown temperature range and third shutdown temperature range have a second overlap in temperature.

In some embodiments, the battery separators include a first layer having a first shutdown temperature range, a second layer having a second shutdown temperature range, and a third layer having a third shutdown temperature range. The second layer is disposed between the first layer and the third layer to create a sandwiched structure. The first shutdown temperature range and the second shutdown temperature range have a first overlap in temperature and the second shutdown temperature range and third shutdown temperature range have a second overlap in temperature. No overlap exists between the first shutdown temperature range and third shutdown temperature range.

In some embodiments, the battery separators include a first layer having a first shutdown temperature range with a first lower limit from 70-125° C. and a first upper limit from 230-270° C.; a second layer having a second shutdown temperature range with a second lower limit from 130-170° C. and a second upper limit from 280-320° C.; and a third layer having a third shutdown temperature range with a third lower limit from 230-270° C. and a third upper limit from 430-470° C. For example, and without limitation, the first shutdown temperature range can span 80-250° C., the second shutdown temperature range can span 150-300° C., and the third shutdown temperature range can span 250-450° C.

Other embodiments for the battery separators are described herein.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Figure 1:
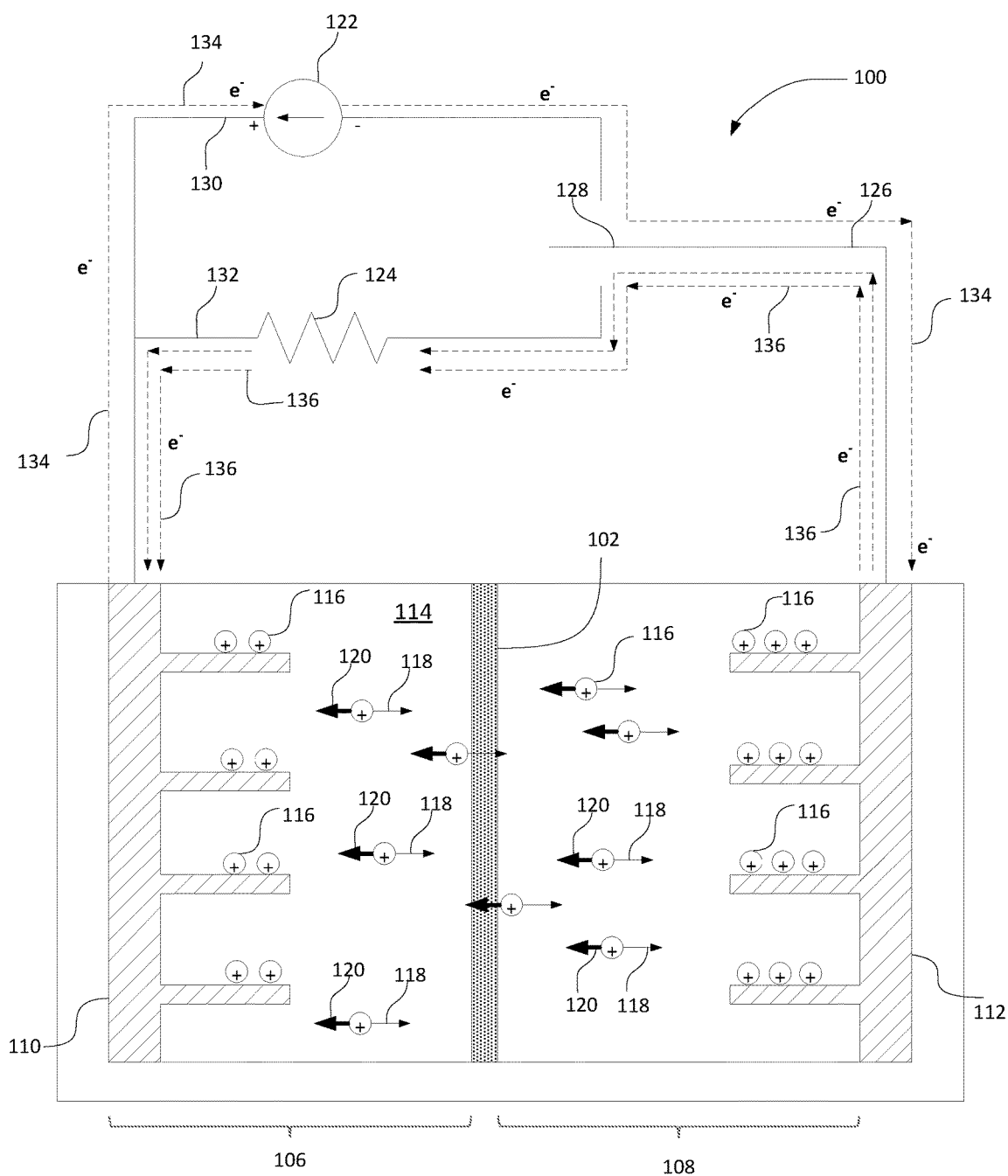
FIG. 1 is a schematic diagram is presented of a battery having a separator in accordance with embodiments of this disclosure.

Now referring to FIG. 1, a schematic diagram is presented of a battery 100 having a separator 102 in accordance with embodiments of this disclosure. The separator 102 partitions the battery into a first portion 106 and a second portion 108. The first portion 106 contains a cathode 110 and the second portion 108 contains an anode 112. The separator 102 therefore physically and electrically isolates the cathode 110 from the anode 112, thereby allowing the battery 100 to control a distribution of charge therein. In FIG. 1, the first portion 106 and the second portion 108 are depicted as having space on either side of the separator 102. However, this depiction is for purposes of illustration only. The separator 102 may be in physical contact with the cathode 110, the anode 112, or both (i.e., no space). During such contact, the cathode 110 and the anode 112 are maintained on opposite sides of the separator 102.

The separator 102 is formed of one or more porous materials that enable ion transport therethrough. The separator 102 includes a first layer having a first shutdown temperature range, a second layer having a second shutdown temperature range, and a third layer having a third shutdown temperature range. The first shutdown temperature range and the second shutdown temperature range have a first overlap in temperature and the second shutdown temperature range and third shutdown temperature range have a second overlap in temperature. In various embodiments, the first shutdown temperature range and third shutdown temperature range do not overlap. Aspects of the separator 102 will be described further in relation to FIGS. 2A-2C.

The battery 100 includes an electrolyte 114 that contains ions 116 therein. The electrolyte 114 serves as a medium for ion transport. The ions 116 may be cations having a positive charge (e.g., lithium cations). In some embodiments, the electrolyte 114 is a fluid medium that may become absorbed within pores of the separator 102. During operation of the battery 110, the electrolyte 114 enables transport of the ions 116 from the cathode 110 to the anode 112 (i.e., charging) and from the anode 112 to the cathode 110 (i.e., discharging). Such transport occurs through pores in the separator 102. Motion of the ions 116 during charging is illustrated in FIG. 1 by single arrows 118. Motion of the ions 116 during discharging is illustrated in FIG. 1 by double arrows 120.

During operation, the battery 100 may charge by coupling to an electrical power source 122 or may discharge by coupling to an electrical load 124. The battery 100 may also be electrically isolated to preserve a charge state (e.g., over-charged, fully-charged, fully-discharged, etc.). Non-limiting examples of the electrical power source 122 include a DC power source and an AC power source. In FIG. 1, the electrical power source 122 is depicted as the DC power source, although this depiction is not intended as limiting. The electrical load 124 can be any type of component that consumes electrical power. For example, and without limitation, the electrical load 124 may be a motor, a pump, an actuator, a display, a computer, a heater, a lamp, etc. Other types of electrical loads 124 are possible. In FIG. 1, the electrical load 124 is depicted as a resistor, although this depiction is for purposes of illustration only.

The battery 100 may be incorporated within a circuit 126 to facilitate charging, discharging, or electrical isolation. The circuit 126 may include the electrical power source 122, the electrical load 124, or both. Multiple instances of the electrical power source 122 and the electrical load 124 are also possible. For purposes of clarity, however, FIG. 1 illustrates the circuit 126 as having a single electrical power source 122 and a single electrical load 124. A switch 128 may be employed in the circuit 124 to selectively establish a pathway for charging 130, a pathway for discharging 132, or an open circuit for electrical isolation. In FIG. 1, the switch 128 is shown establishing the open circuit (i.e., disconnected from the pathway for charging 130 and the pathway for discharging 132).

In operation, i.e., to charge the battery 100, the switch 128 is displaced to provide electrical continuity for the pathway for charging 130. In response, a charging flow of current 134 travels from the cathode 110 to the anode 112. The charging flow of current 134 is driven by a voltage potential of the electrical power source 122. In FIG. 1, the charging flow of current 134 is represented by a dashed line that has arrows indicating a direction of charging flow. Concomitantly, ions 116 in the electrolyte 114 flow from the cathode 110, through the separator 102, and to the anode 116. This flow of charge, which corresponds to a flow of positive charge, counterbalances the charging flow of current 134 received at the anode 112, which corresponds to a flow of negative charge. In FIG. 1, the flow of charge during charging is indicated by single arrows 118.

Current 134 driven by the electrical power source 122 enables the anode 112 to store ions 116 therein. The anode 112 increasingly resists the charging flow of current 134 as the ions 116 are progressively stored. Thus, storage continues until the anode 112 becomes sufficiently saturated in ions 116 that the voltage potential of the electrical power source 122 is insufficient to maintain the charging flow of current 134. At this point, the battery 100 may be in a fully-charged state. The switch 128 may then be displaced to establish the open circuit (i.e., to isolate the battery 100).

To discharge the battery 100, i.e., to power the electrical load 124, the switch 128 is displaced to provide electrical continuity for the pathway for discharging 132. In response, a discharging flow of current 136 travels from the anode 112 to the cathode 110. The discharging flow of current 136 is driven by a voltage of the battery 100, which depends on ion transport within the battery 100. In FIG. 1, the discharging flow of current 134 is represented by a double dashed line 134 that has arrows indicating a direction of discharging flow. Concomitantly, ions 116 in the electrolyte 114 flow from the anode 112, through the separator 102, and to the cathode 110. This flow of charge, which corresponds to a flow of positive charge, counterbalances the discharging flow of current 136 received at the cathode 110, which corresponds to a flow of negative charge. In FIG. 1, the flow of charge during discharging is indicated by double arrows 120.

As the cathode 110 progressively saturates in ions 116, a chemical potential for ion flow within the battery 100 diminishes. Thus, the voltage of the battery 110 decreases notably when the chemical potential is insufficient to drive ion storage in the cathode 110. As a result, the discharge flow of current 136 decreases and the battery 100 may enter a fully-discharged state. At this point, the switch 128 displaced to establish the open circuit (i.e., to isolate the battery 100).

It will be appreciated that chemical reactions at the cathode 112 and anode 110 may generate heat within the battery 100. Moreover, a rate of ion transport during charging and discharging of the battery 100 may influence a rate of heat generation within the battery 100. The one or more porous materials of the separator 102 may therefore be selected to "shutdown" the battery 100 when a safety threshold, such as a critical operating temperature, has been exceeded. In general, the one or more porous materials of the separator 102 may be selected to establish a shutdown temperature range in which the separator 102 exhibits a high resistance to ion transport.

The shutdown temperature range can be bound by a lower temperature limit and an upper temperature limit. The lower temperature limit—which can be a softening temperature of the one or more porous materials—corresponds to an onset of pore collapse within the separator 102. This pore collapse rapidly chokes off ion transport through the separator 102. Chemical reactions at the cathode 112 and anode 110 are therefore arrested and the battery 100 "shuts down". The upper temperature limit corresponds to a breakdown of the separator 102, which may include melting and chemical decomposition. At the upper temperature limit, ion-transport begins to increase, which may stem from contact between the cathode 112 and the anode 110.

Direct contact can create an internal short through the separator 102 that may greatly accelerate chemical reactions at the cathode 112 and anode 110. Such acceleration can produce an uncontrolled generation of thermal energy, i.e., a thermal runaway, which is undesirable for the battery 100. Moreover, pore collapse commonly produces shrinkage in the separator 102 that may bring the cathodes and the anodes closer together (i.e., via thinning). If heat generation persists for a period after pore collapse, the separator 102 may degrade locally around one or more thinned points, risking a loss in dimensional stability, chemical stability, or both. Such losses may increase ion transport and further heat generation.

Selection and arrangement of the one or more porous materials, in accordance with embodiments of this disclosure, can improve the shutdown temperature range of the separator 102 thereby enhancing the safety threshold of the battery 100. Such selection may result in a decrease of the lower temperature limit, and increase of the upper temperature limit, or both.

Figure 2A:
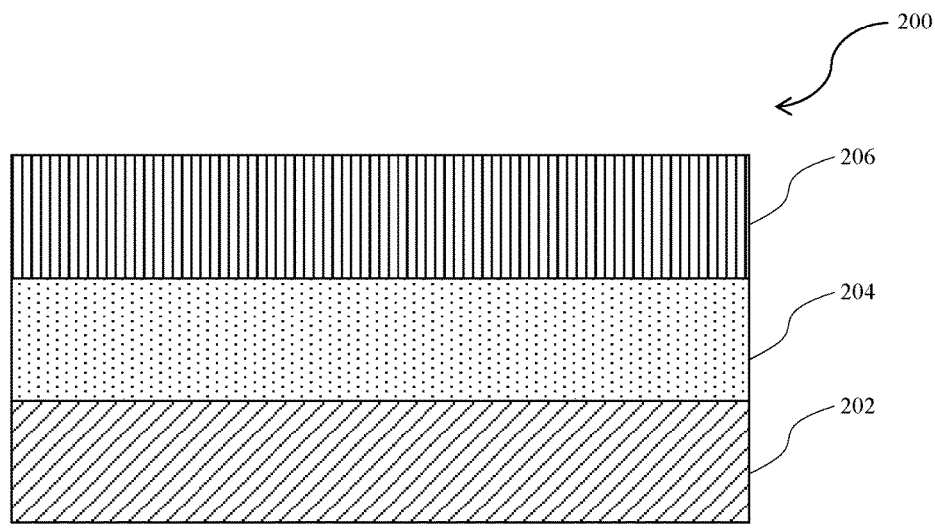
FIG. 2A is a schematic cross-section of a portion of a battery separator in accordance with embodiments of this disclosure.

Now referring to FIG. 2A, a schematic cross-section is presented of a portion of a battery separator 200 in accordance with embodiments of this disclosure. The battery separator 200 may be analogous to the separator 102 described in relation to FIG. 1. The battery separator 200 includes a first layer 202 having a first shutdown temperature range, a second layer 204 having a second shutdown temperature range, and a third layer 206 having a third shutdown temperature range. The first shutdown temperature range and the second shutdown temperature range have a first overlap in temperature and the second shutdown temperature range and third shutdown temperature range have a second overlap in temperature. In various embodiments, the first shutdown temperature range and third shutdown temperature range do not overlap.

In FIG. 2A, the first layer 202, the second layer 204, and the third layer 206 are depicted in a sequential order and with similar thicknesses. This depiction, however, is for purposes of illustration only and is not intended as limiting. Any order is possible for the first layer 202, the second layer 204, and the third layer 206. Moreover, the first layer 202, the second layer 204, and the third layer 206 may exhibit any thickness. In some embodiments, the first layer 202, the second layer 204, and the third layer 206 have corresponding thicknesses between 0.3-0.5 micrometers.

Non-limiting examples of materials for the battery separator 200 and its layers 202-206 are listed in TABLE 1. The listed materials may be either porous or non-porous. TABLE 1 also provides melting temperatures and shutdown ranges for each listed material. It will be understood that TABLE 1 is intended as neither an exhaustive list nor an exclusive list of possible materials. Moreover, the melting temperatures and the shutdown ranges are representative and may vary with unlisted characteristics of each corresponding material (e.g., mean pore size, pore connectivity, volume fraction of pores, volume fraction of crystalline material, hydrocarbon chain length, functional chemical groups, etc.).

TABLE 1

| Material | Melting Temperature | Shutdown Range |
| --- | --- | --- |
| Polyethylene (Low Density) | 163° C. | 120-220° C. |
| Polypropylene (Low Density) | 177° C. | 140-250° C. |
| Polyethylene (High Density) | 204° C. | 150-250° C. |
| Polymethyl methacrylate | 218° C. | 150-250° C. |
| Polyethylene terephthalate | 260° C. | 150-300° C. |
| Polybutylene terephthalate | 260° C. | 200-300° C. |
| Polytetrafluoroethylene | 316° C. | 250-370° C. |
| Polyamide-imide | 343° C. | 250-450° C. |
| Polyetherimide | 371° C. | 250-450° C. |
| $Al_2O_3$ | 2072° C. | 2072° C. |

In TABLE 1, the shutdown ranges for each material have upper limits higher than the corresponding melting temperatures. Without wishing to be limited to any theory or mode of action, shutdown temperature ranges can be higher than melting temperatures. Factors that can influence shutdown temperature ranges may include, but are not limited to, material chemistry, the molecular weight of materials, the length of functional groups in the materials, interactions between functional groups, and combinations thereof. In various embodiments, higher molecular weight and functional groups can contribute to an increased temperature range.

It will be appreciated that one or more materials may be selected for each layer of the battery separator 200 to define a corresponding shutdown temperature range (i.e., the first shutdown temperature range, the second shutdown temperature range, and the third shutdown temperature range). If applicable, this selection may also define an overlap with other shutdown temperature ranges (i.e., the first overlap and second overlap). The one or more materials may be distributed in each layer without restriction. In some embodiments, the first layer 202, the second layer 204, the third layer 206, or any combination thereof, includes a stack of films. In these embodiments, each film in the stack of films corresponds to a single material. In some embodiments, the first layer 202, the second layer 204, the third layer 206, or any combination thereof, include a composite material having one or more secondary materials disposed in a matrix of primary material.

In some embodiments, the first shutdown temperature range has a first lower limit from 70-125° C. and a first upper limit from 230-270° C.; the second shutdown temperature range has a second lower limit from 130-170° C. and a second upper limit from 280-320° C.; and the third shutdown temperature range has a third lower limit from 230-270° C. and a third upper limit from 430-470° C. For example, and without limitation, the first shutdown temperature range can span 80-250° C., the second shutdown temperature range can span 150-300° C., and the third shutdown temperature range can span 250-450° C.

In some embodiments, the first shutdown temperature range spans 80-250° C. In some embodiments, the first overlap is at least 30° C. In some embodiments, the second overlap is at least 30° C. In some embodiments, the first overlap and the second overlap are at least 30° C. In some embodiments, the battery separator 200 includes a ceramic layer. In further embodiments, the ceramic layer has a melting temperature above 600° C. In these embodiments, the ceramic layer may be an aluminum oxide material (e.g., $Al_2O_3$).

In some embodiments, the first shutdown temperature range, the second shutdown temperature range, the third shutdown temperature range, the first overlap, and the second overlap provide a continuous shutdown range over an expanded range of temperatures. In these embodiments, the continuous shutdown range may be continuously increasing (or decreasing).

Figure 2B:
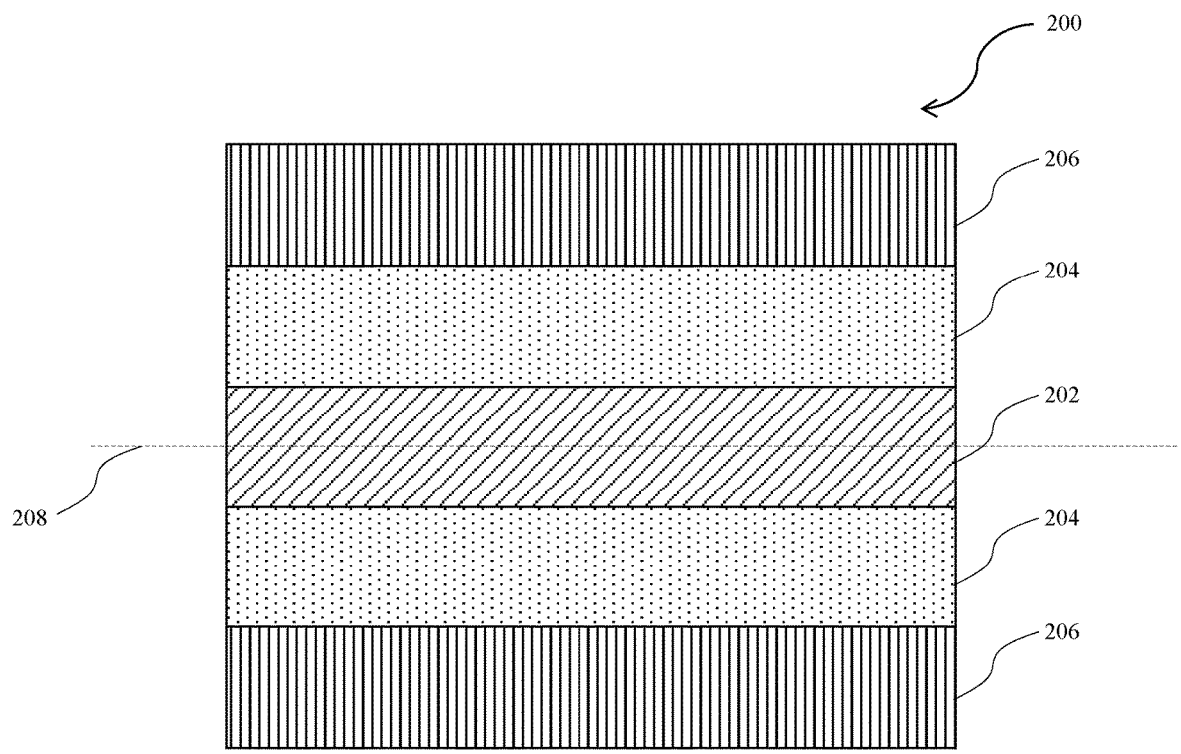
FIG. 2B is a schematic cross-section of a portion of a battery separator having a structure with a symmetric arrangement of layers about a center, in accordance with embodiments of this disclosure.

It will be appreciated that the first layer 202, the second layer 204, and the third layer 206 are not limited to single instances within the battery separator 200. Multiple instances are possible. In some embodiments, the battery separator 200 includes a structure having a symmetrical arrangement of the first layer 202, the second layer 204, and the third layer 206 about a center 208. In these embodiments, the symmetrical arrangement allows the first shutdown temperature range, second shutdown temperature range, and third shutdown temperature range to also be distributed symmetrically about the center 208. FIG. 2B presents a non-limiting example of one possible structure for the battery separator 200. In this non-limiting example, the first layer 202 incorporates the center 208 of the structure.

Figure 2C:
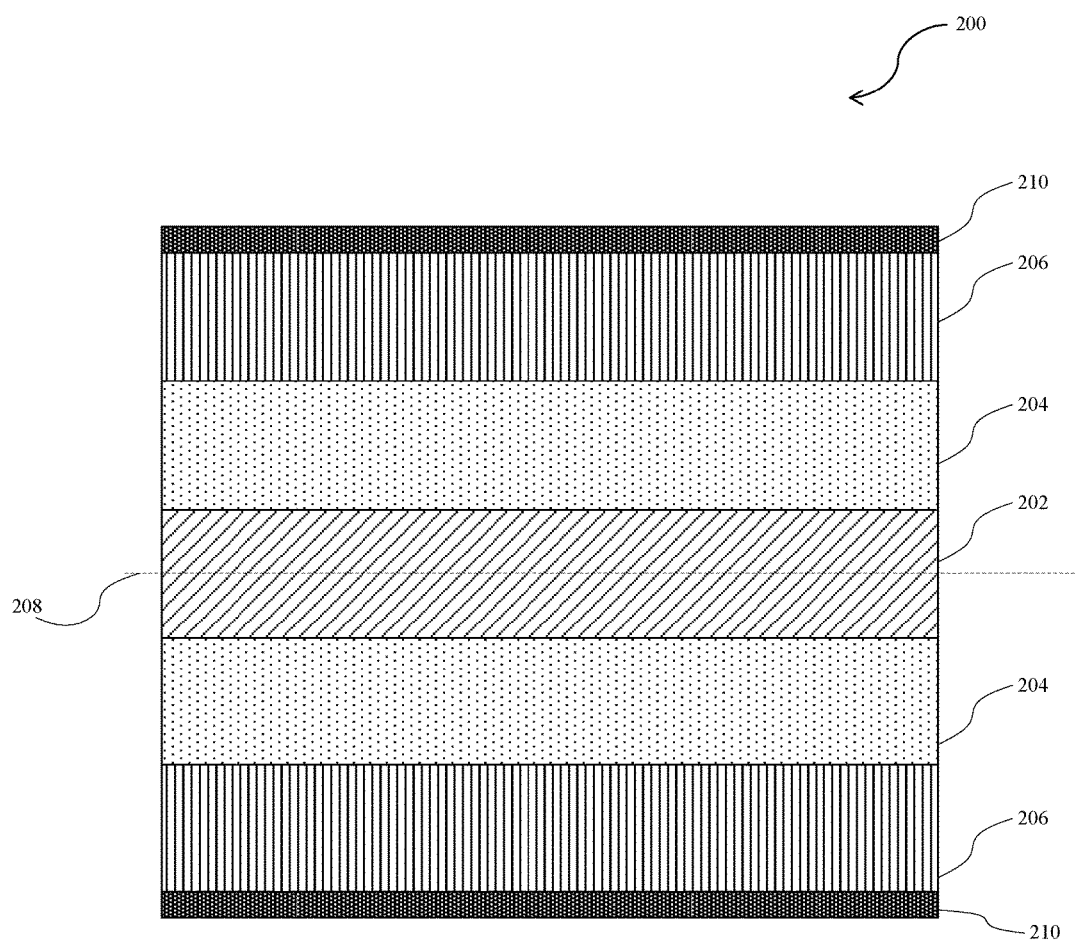
FIG. 2C is a schematic cross-section of the battery separator shown in FIG. 2B, but where ceramic layers are disposed onto exterior-facing surfaces of the structure, in accordance with embodiments of this disclosure.

While the first layer 202, the second layer 204, and the third layer 206 are distributed symmetrically about the center 208, materials forming the first layer 202, the second layer 204, and the third layer 206 need not be so. The first layer 202, the second layer 204, and the third layer 206 may include any combination of materials that result in the first shutdown temperature range, second shutdown temperature range, and third shutdown temperature range being distributed symmetrically. In further embodiments, such as that shown in FIG. 2C, a ceramic layer 210 is disposed onto exterior-facing surfaces of the structure. The ceramic layer 210 may share a common ceramic material on each side of the structure, or alternatively, may be formed of different ceramic materials. In FIG. 2C, the structure is depicted as having ceramic layer 210 formed of the common ceramic material. The ceramic layer 210 may have a melting temperature above 600° C. and may be an aluminum oxide material (e.g., $Al_2O_3$).

According to an illustrative embodiment, a battery separator includes a first layer having a first shutdown temperature range, a second layer having a second shutdown temperature range, and a third layer having a third shutdown temperature range. The second layer is disposed between the first layer and the second layer to create a sandwiched structure. The first shutdown temperature range and the second shutdown temperature range have a first overlap in temperature and the second shutdown temperature range and third shutdown temperature range have a second overlap in temperature. No overlap exists between the first shutdown temperature range and third shutdown temperature range. The first layer, the second layer, the third layer, or any combination thereof, may be formed of materials listed in TABLE 1.

In some embodiments, the first shutdown temperature range has a first lower limit from 70-125° C. and a first upper limit from 230-270° C.; the second shutdown temperature range has a second lower limit from 130-170° C. and a second upper limit from 280-320° C.; and the third shutdown temperature range has a third lower limit from 230-270° C. and a third upper limit from 430-470° C. For example, and without limitation, the first shutdown temperature range can span 80-250° C., the second shutdown temperature range can span 150-300° C., and the third shutdown temperature range can span 250-450° C.

In some embodiments, the first shutdown temperature range spans 80-250° C. In some embodiments, the first overlap is 20° C. or less. In some embodiments, the second overlap is 20° C. or less. In some embodiments, the first overlap and the second overlap are 20° C. or less. In some embodiments, the battery separator 200 includes a ceramic layer. In further embodiments, the ceramic layer has a melting temperature above 600° C. In these embodiments, the ceramic layer may be an aluminum oxide material (e.g., $Al_2O_3$).

In some embodiments, the first shutdown temperature range, the second shutdown temperature range, the third shutdown temperature range, the first overlap, and the second overlap provide a continuous shutdown range over an expanded range of temperatures. In these embodiments, the continuous shutdown range may be continuously increasing (or decreasing).

According to an illustrative embodiment, a battery separator includes a first layer having a first shutdown temperature range of 80-250° C., a second layer having a second shutdown temperature range of 150-300° C., and a third layer having a third shutdown temperature range of 250-450° C. The first layer, the second layer, the third layer, or any combination thereof, may be formed of materials listed in TABLE 1.

In some embodiments, the first layer, the second layer, and the third layer having corresponding thicknesses between 0.3-0.5 micrometers. In some embodiments, the first layer includes polyethylene, polypropylene, polyvinyl chloride, or a combination thereof. In some embodiments, the second layer includes polymethyl methacrylate, polybutylene terephthalate, polyethylene terephthalate, or a combination thereof. In some embodiments, the third layer includes polyamide-imide, polyetherimide, polytetrafluoroethylene, or a combination thereof. In some embodiments, the battery separator further includes a ceramic layer selected from the group consisting of an aluminum oxide material, a silicon oxide material, a titanium oxide material, and a zirconium oxide material.

In some embodiments, the first shutdown temperature range, the second shutdown temperature range, the third shutdown temperature range, the first overlap, and the second overlap provide a continuous shutdown range over an expanded range of temperatures. In these embodiments, the continuous shutdown range may be continuously increasing (or decreasing).

The separators may form part of a battery cell. The battery cell may be a lithium-ion or lithium-polymer battery cell that is used to power a device used in a consumer, medical, aerospace, defense, and/or transportation application. The battery cell can be a jelly roll containing a number of layers which are wound together, including a cathode with an active coating, the separator, and an anode with an active coating. In some aspects, the jelly roll may include one strip of cathode material (e.g., aluminum foil coated with a lithium compound) and one strip of anode material (e.g., copper foil coated with carbon) separated by one strip of separator material (e.g., conducting polymer electrolyte). The cathode, anode, and separator layers may then be wound on a mandrel to form a spirally wound structure. Alternatively, the layers may be stacked and/or used to form other types of battery cell structures, such as bi-cell structures. Such structures are well known in the art.

The batteries, components thereof, and various non-limiting components and embodiments as described herein can be used with various electronic devices. Such electronic devices can be any electronic devices known in the art. For example, the device can be a telephone, such as a mobile phone, and a land-line phone, or any communication device, such as a smart phone, including, for example an iPhone®, and an electronic email sending/receiving device. The battery cans, battery assemblies, and various non-limiting components and embodiments as described herein can be used in conjunction with a display, such as a digital display, a TV monitor, an electronic-book reader, a portable web-browser (e.g., iPad®), watch (e.g., AppleWatch), or a computer monitor. The device can also be an entertainment device, including a portable DVD player, conventional DVD player, Blue-Ray disk player, video game console, music player, such as a portable music player (e.g., iPod®), etc. Devices include control devices, such as those that control the streaming of images, videos, sounds (e.g., Apple TV®), or a remote control for a separate electronic device. The device can be a part of a computer or its accessories, laptop keyboard, laptop track pad, desktop keyboard, mouse, and speaker.

The above-described methods and processes can be embodied as code and/or data, which can be stored in a computer-readable storage medium as described above. In some embodiments the code and/or data are tangibly embodied on a non-transitory computer-readable storage medium. When a computer system reads and executes the code and/or data stored on the computer-readable storage medium, the computer system performs the methods and processes as they are embodied as the respective code and/or data structures in the computer-readable storage medium.

Examples of computer-readable storage medium can include, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

Furthermore, methods and processes described herein can be included in hardware circuits or apparatus. These circuits or apparatus may include, but are not limited to, an application-specific integrated circuit (ASIC) chip, a field-programmable gate array (FPGA), a dedicated or shared processor that executes operations embodied in code and/or data structures, as well as other programmable-logic devices now known or later developed. When the hardware modules or apparatus are activated, they perform the methods and processes included within them.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A battery separator, comprising:
   a first layer having a first shutdown temperature range wherein the first layer comprises at least one of polyethylene, polypropylene, and polyvinyl chloride;
   a second layer having a second shutdown temperature range wherein the second layer comprises at least one of polymethyl methacrylate, polybutylene terephthalate, and poly ethylene terephthalate; and
   a third layer having a third shutdown temperature range;
   wherein the first shutdown temperature range and second shutdown temperature range have a first overlap in temperature of at least 30° C.; and
   wherein the second shutdown temperature range and third shutdown temperature range have a second overlap in temperature of at least 30° C.

2. The battery separator of claim 1, wherein the first shutdown temperature range and third shutdown temperature range do not overlap.

3. The battery separator of claim 1, further comprising a ceramic layer.

4. The battery separator of claim 3, wherein the ceramic layer has a melting temperature above 600° C.

5. A battery separator, comprising:
   a first layer having a first shutdown temperature range wherein the first layer comprises at least one of polyethylene, polypropylene, and polyvinyl chloride;
   a second layer having a second shutdown temperature range wherein the second layer comprises at least one of polymethyl methacrylate, polybutylene terephthalate, and poly ethylene terephthalate;
   a third layer having a third shutdown temperature range; and
   wherein the second layer is disposed between the first layer and third layer to create a sandwiched structure;
   wherein the first shutdown temperature range and second shutdown temperature range have a first overlap in temperature of at least 30° C.; and
   wherein the second shutdown temperature range and third shutdown temperature range have a second overlap in temperature of at least 30° C.

6. The battery separator of claim 5, wherein the first shutdown temperature range and third shutdown temperature range do not overlap.

7. The battery separator of claim 5, wherein the first shutdown temperature range spans 80-250° C.

8. The battery separator of claim 5, further comprising a ceramic layer.

9. The battery separator of claim 8, wherein the ceramic layer has a melting temperature above 600° C.

10. A battery separator, comprising:
    a first layer having a first shutdown temperature range of 80-250° C. wherein the first layer comprises at least one of polyethylene, polypropylene, and polyvinyl chloride;
    a second layer having a second shutdown temperature range of 150-300° C. wherein the second layer comprises at least one of polymethyl methacrylate, polybutylene terephthalate, and poly ethylene terephthalate; and
    a third layer having a third shutdown temperature range of 250-450° C.

11. A battery comprising:
    a cathode;
    an anode; and
    a separator according to claim 1 disposed between the cathode and the anode.

12. A battery comprising:
    a cathode;
    an anode; and
    a separator according to claim 5 disposed between the cathode and the anode.

13. A battery comprising:
    a cathode;
    an anode; and
    a separator according to claim 10 disposed between the cathode and the anode.

* * * * *